(12) United States Patent
Park et al.

(10) Patent No.: US 9,877,340 B1
(45) Date of Patent: Jan. 23, 2018

(54) UNIFIED SCHEDULER FOR WIRELESS COMMUNICATION

(71) Applicant: Sprint Spectrum LP, Overland Park, KS (US)

(72) Inventors: Sungki Park, Ashburn, VA (US); Saied Kazeminejad, Ashburn, VA (US); Brent Scott, Drexel, MO (US)

(73) Assignee: Sprint Spectrum LP, Overland Park, KS (US)

( * ) Notice: Subject to any disclaimer, the term of this patent is extended or adjusted under 35 U.S.C. 154(b) by 1306 days.

(21) Appl. No.: 13/688,202

(22) Filed: Nov. 28, 2012

(51) Int. Cl.
*H04B 7/00* (2006.01)
*H04W 72/12* (2009.01)

(52) U.S. Cl.
CPC ............... *H04W 72/1278* (2013.01)

(58) Field of Classification Search
USPC ........................................... 455/509
See application file for complete search history.

(56) References Cited

U.S. PATENT DOCUMENTS

| 8,478,331 | B1* | 7/2013 | Rogers et al. | 455/550.1 |
| 2009/0325594 | A1* | 12/2009 | Lan et al. | 455/456.1 |
| 2015/0029965 | A1* | 1/2015 | Aminaka et al. | 370/329 |

* cited by examiner

*Primary Examiner* — Ankur Jain

(57) ABSTRACT

In systems and methods of communicating with a wireless device, base band unit data is received at a base band unit from a communication network for the wireless device, and a control signal associated with the data is also received, the control signal comprising a frequency band identifier. A scheduling module is selected from among a plurality of scheduling modules based on the frequency band identifier, and transmission of the data is scheduled to the wireless using the selected scheduling module.

13 Claims, 6 Drawing Sheets

UNIFIED SCHEDULER FOR WIRELESS COMMUNICATION

TECHNICAL BACKGROUND

Wireless communication systems may use a plurality of frequency bands for communication with wireless devices. Frequency bands are typically associated with network providers. Network providers may agree to share radio resources with other network providers, though due to the scarcity of such resources sharing agreements may be limited to certain radio resources and may exclude other radio resources. Typically, to schedule data to be transmitted in a multi-operator network, separate scheduler hardware is required for each frequency band.

OVERVIEW

In operation, base band unit data is received at a base band unit from a communication network for a wireless device. A control signal associated with the data is also received, wherein the control signal comprises a frequency band identifier. A scheduling module is selected from among a plurality of scheduling modules based on the frequency band identifier, and transmission of the data is scheduled to the wireless using the selected scheduling module.

DETAILED DESCRIPTION

Figure 1:
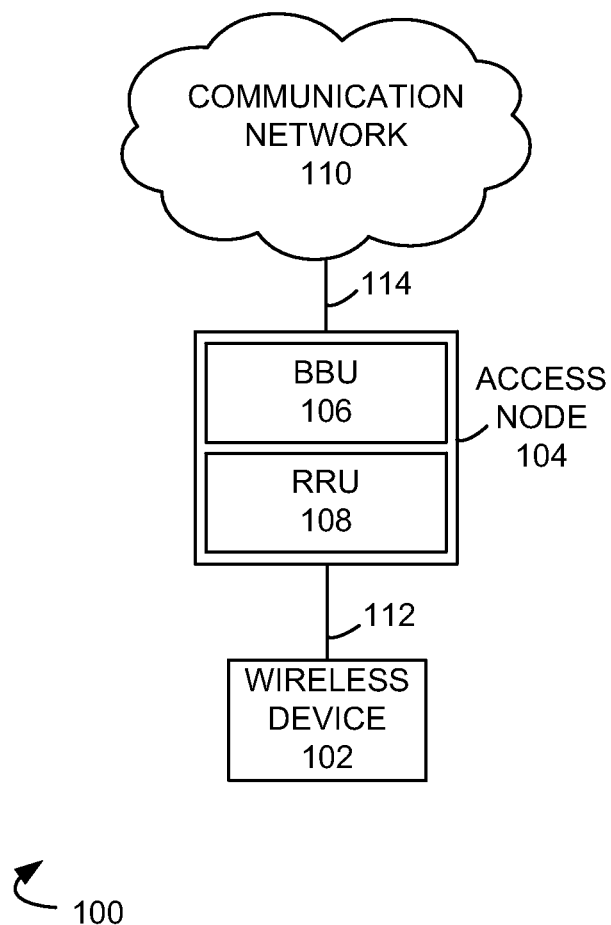
FIG. 1 illustrates an exemplary communication system to schedule communication with a wireless device.

FIG. 1 illustrates an exemplary communication system 100 for scheduling communication with a wireless device comprising wireless device 102, access node 104 and communication network 110. Examples of wireless device 102 can include a cell phone, a smart phone, a computing platform such as a laptop, palmtop, or tablet, a personal digital assistant, or an Internet access device, including combinations thereof. Wireless device 102 is in communication with access node 104 through communication link 112.

Access node 104 is a network node capable of providing wireless communications to wireless device 102, and can be, for example, a base transceiver station, a radio base station, an eNodeB device, or an enhanced eNodeB device. Access node 104 is in communication with communication network 110 through communication link 114.

Access node 104 further comprises base band unit (BBU) 106 and radio remote unit (RRU) 108. While BBU 106 and RRU 108 are illustrated in FIG. 1 as logical blocks comprising access node 104, in embodiments BBU 106 and RRU 108 may be spatially separated and may communicate over a communication interface. BBU 106 performs base band processing and scheduling functions, and provides data to RRU 108 for transmission to wireless device 102 over communication link 112.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112 and 114 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 110 which are omitted for clarity, including additional processing nodes, routers, gateways, and physical and/or wireless data links for carrying data among the various network elements.

A communication system, such as communication system 100, may use a plurality of frequency bands or carriers to communicate with wireless devices, such as wireless device 102. For example, RRU 108 can be configured to use a plurality of frequency bands to communicate with wireless device 102. Network providers, in order to conserve frequency band and other resources, may enter into relationships with other network providers to share frequency band and other resources. For example, multiple network providers may operate in a multi-operator core network environment, and may enter into agreements to share frequency band and other network resources. Sharing agreements may be limited in scope, and network providers may share resources of one frequency band while not sharing resources of another frequency band. Where BBU 106 is configured to process information for a plurality of frequency bands, at least one of which is shared with another network provider, and at least one of which is not shared with the other network provider, the use of multiple scheduler devices to handle the information for each frequency band may require different hardware for each frequency band, increasing burdens of deployment, configuration and maintenance for such additional hardware.

Figure 2:
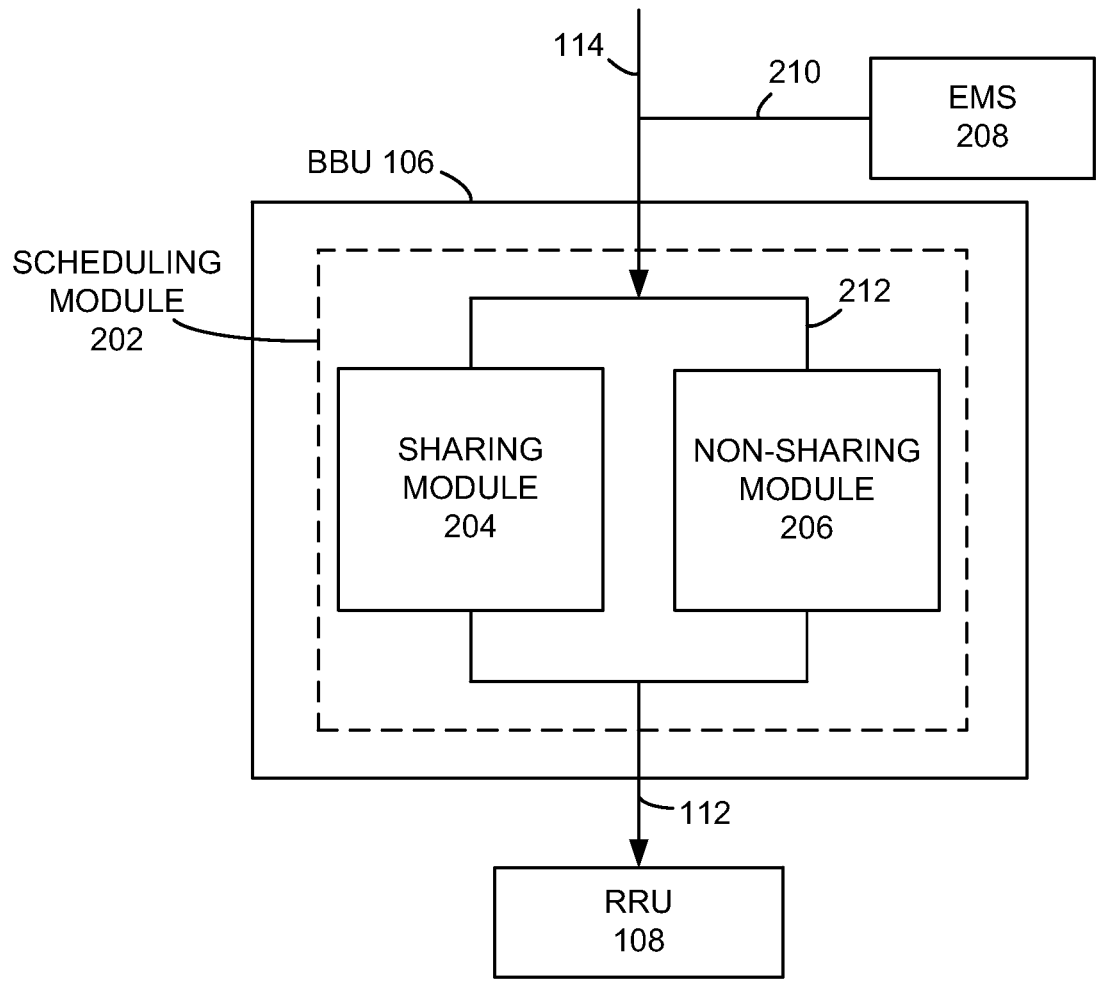
FIG. 2 illustrates an exemplary base band unit in a communication system.

FIG. 2 illustrates an exemplary base band unit in a communication system. BBU 106 comprises scheduling module 202, which can comprise sharing module 204 and non-sharing module 206. Data can be received by BBU 106 over communication link 114. The data can comprise data from communication network 110. The data can also comprise carrier (frequency band) identification information from element management system (EMS) 208 over communication link 210 (which can join communication link 114, or which can be a separate communication link with BBU 106). Sharing module 204 and non-sharing module 206 are scheduling modules. Sharing module 204 handles information regarding frequency bands which are shared with another network provider. Non-sharing module 206 handles information regarding frequency bands which are not shared with another network provider.

EMS 208 provides a unique identifier for each frequency band handled by BBU 106. BBU 106 functions are typically limited to baseband processing, and BBU 106 typically does not have information regarding the pass band which is transmitted to wireless device 102 by RRU 108. However, each carrier can be assigned a unique identifier by EMS 208. For example, EMS 208 can monitor a channel card for each carrier from control signaling which can be exchanged between BBU 106 and EMS 208 over communication link 210. BBU 106 can be configured to extract the unique carrier identifier from a control signaling message from EMS 208. BBU 106 can further be configured to process the unique carrier identifier information and provide the processed unique carrier identifier information to scheduling module 202. The processed unique carrier identifier information can be used by scheduling module 202 for selecting sharing module 204 and non-sharing module 206 to handle processing of information received from communication network 110.

In operation, base band unit data is received at BBU 106 from communication network 110 for wireless device 102, and a control signal associated with the data is received from EMS 208 at BBU 106, the control signal comprising a frequency band identifier. A scheduling module is selected from among sharing module 204 and non-sharing module 206 based on the frequency band identifier, and transmission of the base band unit data is scheduled to wireless device 102 using the selected scheduling module.

Figure 3:
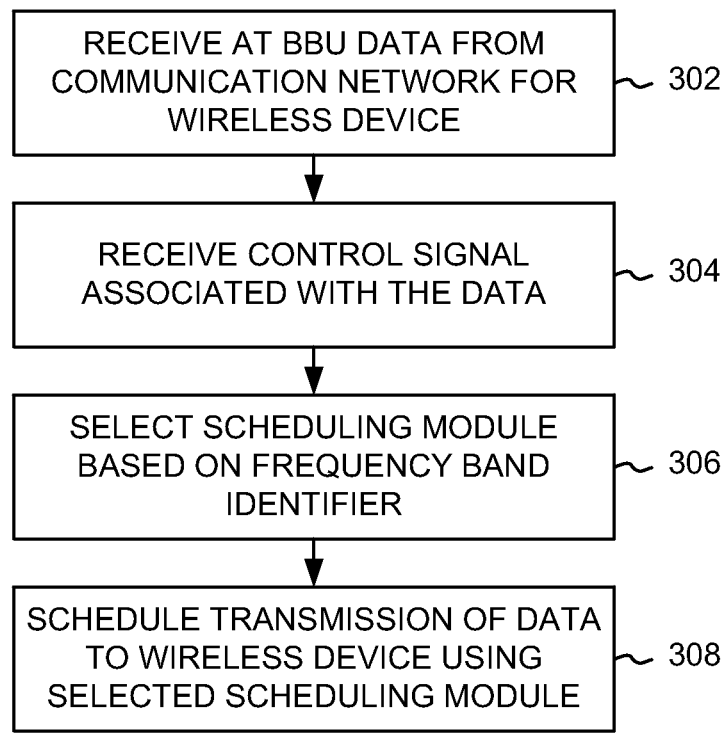
FIG. 3 illustrates an exemplary method of communicating with a wireless device.

FIG. 3 illustrates an exemplary method of communicating with a wireless device. In operation 302, base band unit data is received from a communication network for a wireless device. For example, BBU 106 can receive base band unit data from communication network 110 over communication link 114.

In operation 304, control signal data associated with the received base band unit data is received, where the control signal data comprises a unique frequency band identifier. For example, BBU 106 can receive control signal data from EMS 208. The control signal data can comprise a unique frequency band identifier for the received base band unit data.

In operation 306, a scheduling module can be selected from among a plurality of scheduling modules of the base band unit based on the frequency band identifier. For example, the control signal data from EMS 208 can be processed by BBU 106, and the unique frequency band identifier can be extracted from the control signal data. Based on the frequency band identifier, it can be determined whether the base band unit data is associated with a shared frequency band, or with a frequency band which is not shared by the network provider. In an embodiment, BBU 106 comprises a plurality of scheduling modules, for example, a first scheduling module used by a first network provider and a second network provider, and a second scheduling module used only by the first network provider.

When the frequency band identifier indicates that the base band unit data is related to a shared frequency band, sharing module 204 can be selected. When the frequency band identifier indicates that the base band unit data is related to a frequency band which is not shared, non-sharing module 206 can be selected. In an embodiment, the first scheduling module is selected when the frequency band identifier indicates a frequency band shared by the first network provider and the second provider. In an embodiment, the second scheduling module is selected when the frequency band identifier indicates a frequency band used by only the first network provider.

In operation 308, transmission of the base band unit data to the wireless device is scheduled using the selected scheduling module. For example, when transmission to the wireless device is intended to be over a shared frequency band, sharing module 204 can be used to schedule transmission of the data. When transmission to the wireless device is intended to be over a frequency band which is not shared, non-sharing module 206 can be used to schedule transmission of the data. Use of modules within scheduling module 202 to schedule transmission of data to a wireless device obviates the need for separate hardware to perform scheduling operations.

Figure 4:
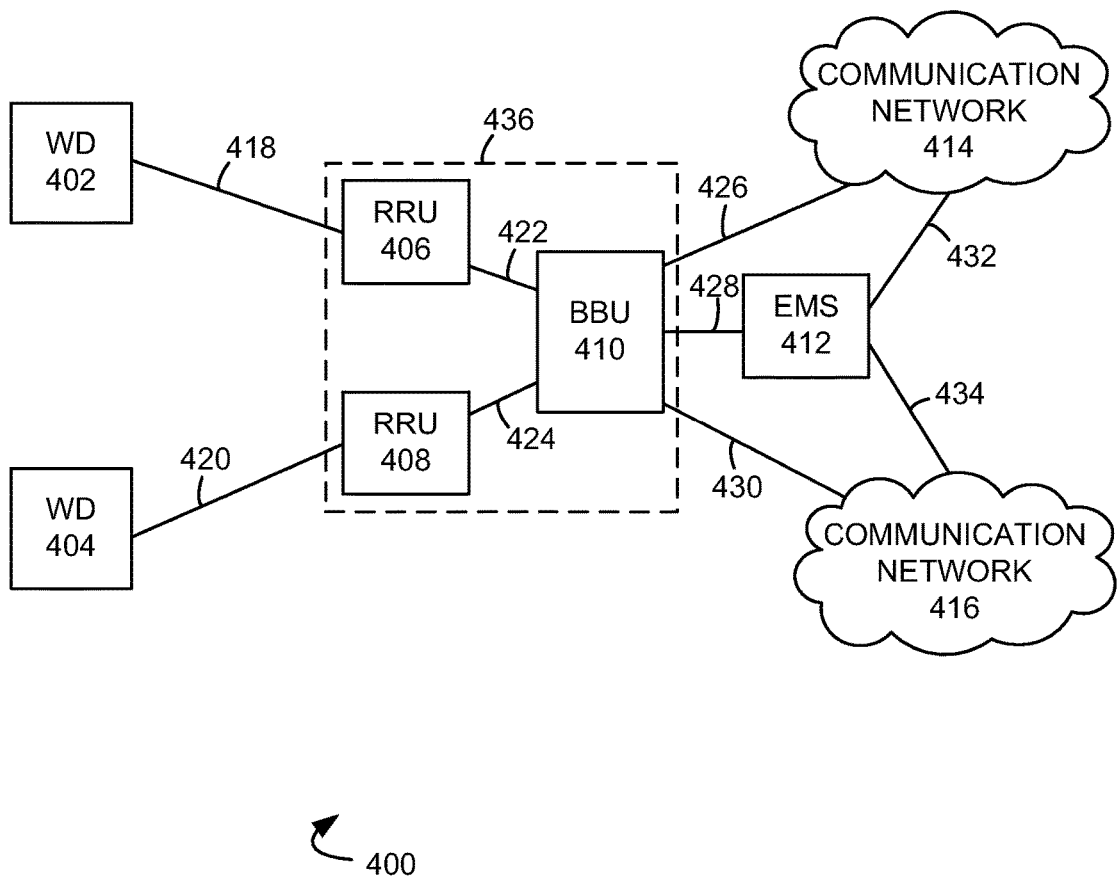
FIG. 4 illustrates another exemplary communication system to schedule communication with a wireless device.

FIG. 4 illustrates another exemplary communication system to schedule communication with a wireless device comprising wireless devices 402 and 404, access node 436 comprising radio remote units (RRU) 406 and 408 and base band unit (BBU) 410, element management system (EMS) 412, communication network 414, and communication network 416. Examples of wireless devices 402 and 404 can include a cell phone, a smart phone, a computing platform such as a laptop, palmtop, or tablet, a personal digital assistant, or an Internet access device, including combinations thereof. Wireless device 402 is in communication with RRU 406 over communication link 418, and wireless device 404 is in communication with RRU 408 over communication link 420.

Access node 436 comprises BBU 410, RRU 406 and RRU 408. BBU 410 performs base band processing and scheduling functions, and provides data to RRU 406 over communication link 422 for transmission to wireless device 402, as well as to RRU 408 over communication link 424 for transmission to wireless device 404. BBU 410 is also in communication with communication network 414 over communication link 424, and with communication network 416 over communication link 434.

RRU 406 and RRU 408 each are radio resource units configured to transmit a pass band signal to each of wireless device 402 and 404, respectively. RRU 406 and RRU 408 can be configured to transmit the pass band signal in one of a plurality of frequency bands. The frequency bands may be associated with a network provider.

EMS 412 is in communication with BBU 410 over communication link 428. EMS 412 can provide a unique identifier for each frequency band handled by BBU 410. For example, EMS 412 can monitor a channel card for each carrier from control signaling which can be exchanged between BBU 410 and EMS 412 over communication link 428, and each frequency band can be assigned a unique identifier by EMS 412. BBU 410 can be configured to extract the unique carrier identifier from a control signaling message from EMS 412. EMS 412 is also in communication with communication network 414 over communication link 432, and with communication network 416 over communication link 434.

Communication networks 414 and 416 can each be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication networks 414 and 416 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication networks 414 and 416 may also comprise a wireless network, including base stations, wireless communication nodes, telephony switches, internet routers, network gateways, computer systems, communication links, or some other type of communication equipment, and combinations thereof.

Communication networks 414 and 416 may be operated by a first network operation and a second network provider, respectively. The first and second network providers may agree to share network resources, including EMS 412 and BBU 410, as well as certain frequency bands. In an embodiment, wireless device 402 can be associated with the first network provider, and wireless device 404 can be associated with the second wireless network provider.

Communication links 418, 420, 422, 424, 426,428, 430, 432 and 434 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 436, EMS 412, communication network 414 and communication network 416 which are omitted for clarity, including additional processing nodes, routers, gateways, and physical and/or wireless data links for carrying data among the various network elements.

Figure 5:
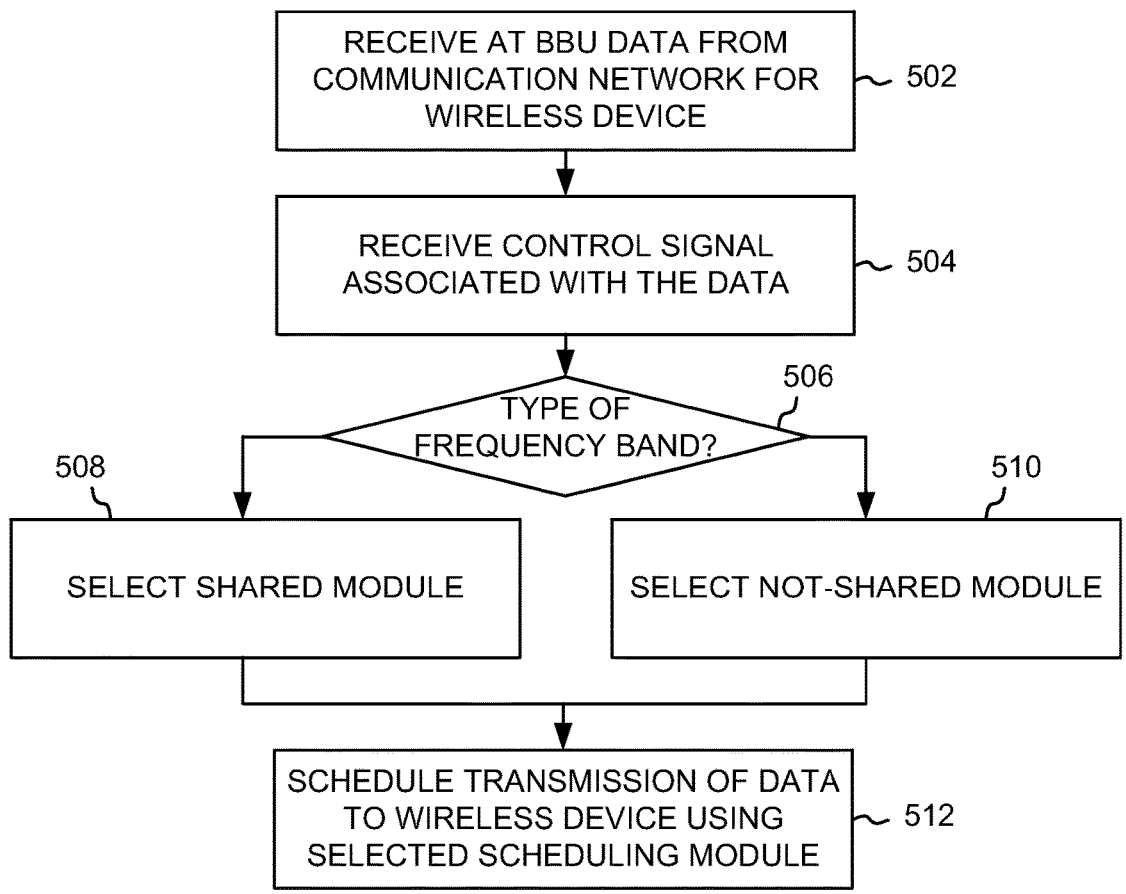
FIG. 5 illustrates another exemplary method of communicating with a wireless device.

FIG. 5 illustrates another exemplary method of communicating with a wireless device. In operation 502, data is received at a base band unit of an access node controlled by a first network provider for a wireless device associated with a second network provider from a communication network controlled by the second network provider. For example, BBU 410 can be controlled by a first network provider, communication network 416 can be controlled by a second network provider, and wireless device 404 can be associated with the second network provider.

In operation 504, a control signal associated with the data comprising a frequency band identifier and a network provider identifier can be received. For example, a control signal comprising a frequency band identifier and a network provider identifier can be received from EMS 412 at BBU 410. The control signal can be associated with the data for the wireless device associated with the second network provider, such as wireless device 404.

In operation 506, the type of frequency band is determined based on the frequency band identifier and the network provider identifier. For example, BBU 410 can extract the frequency band identifier and the network provider identifier from the control signal received from EMS 412. Based on the frequency band identifier and the network provider identifier, BBU 410 can determine whether the frequency band is a frequency band which is shared by the first network provider with the second network provider, or whether the frequency band is a frequency band which is not shared with the second network provider.

Based on the frequency band identifier and the network provider identifier, a scheduling module is selected from among a plurality of scheduling modules of the base band unit. In an embodiment, BBU 410 comprises a plurality of scheduling modules. A first scheduling module can be associated with a first frequency band used by both the first network provider and the second network provider (a shared module), and a second scheduling module can be associated with only the first network provider (a not-shared module). When the determination based on the frequency band identifier and the network provider identifier indicates that the frequency band is shared, a shared module is selected (operation 508). When the determination based on the frequency band identifier and the network provider identifier indicates that the frequency band is not shared, a not-shared module is selected (operation 510). For example, when the frequency band identifier indicates a shared frequency band and the network provider identifier indicates the second network provider, the shared module can be selected.

In operation 512, transmission of the data is scheduled to the wireless device using the scheduling module. The use of modules by BBU 410 to schedule transmission of data to a wireless device obviates the need for separate hardware to perform scheduling operations. In an embodiment, transmission of the data to the wireless device is scheduled using the first frequency band when the first scheduling module is selected. For example, transmission of the data to wireless device 404 can be scheduled using the first frequency band when the shared module is selected.

As one example, the first network provider and the second network provider can operate in a multi-operator core network environment. The first network provider may share a first frequency band with the second network provider, and may not share a second frequency band with the second network provider. For example, the first frequency band can be 1.6 GHz, and the second frequency band can be 1.9 GHz. The scheduling function of BBU 410 can take into account the sharing scheme of the first frequency band for wireless devices associated with the second network provider. Thus, BBU 410 can perform scheduling for different frequency bands using the same BBU hardware, obviating the need for separate schedulers to process different frequency bands.

In an embodiment, BBU 410 comprises a unified scheduler which may be applied for operation with multiple frequency bands using the same BBU hardware and software. For example, the unified scheduler can comprise two logical modules, a first module for resource sharing and a second module for resources which are not shared. In an embodiment, frequency band identification information can be extracted from a control signaling message from an element management system (for example, EMS 412), and the extracted information can be processed to determine whether a shared frequency band or a non-shared frequency band is indicated. The determined indication can be encoded, for example by single-bit encoding (as one example, 1 for a shared frequency band and 0 for a non-shared frequency band) and the encoded indication can be provided to a scheduling module and used to select a shared module or a not-shared module. Thus, a unified scheduler can be provided which can be applied to different frequency bands by the same BBU hardware and software.

Figure 6:
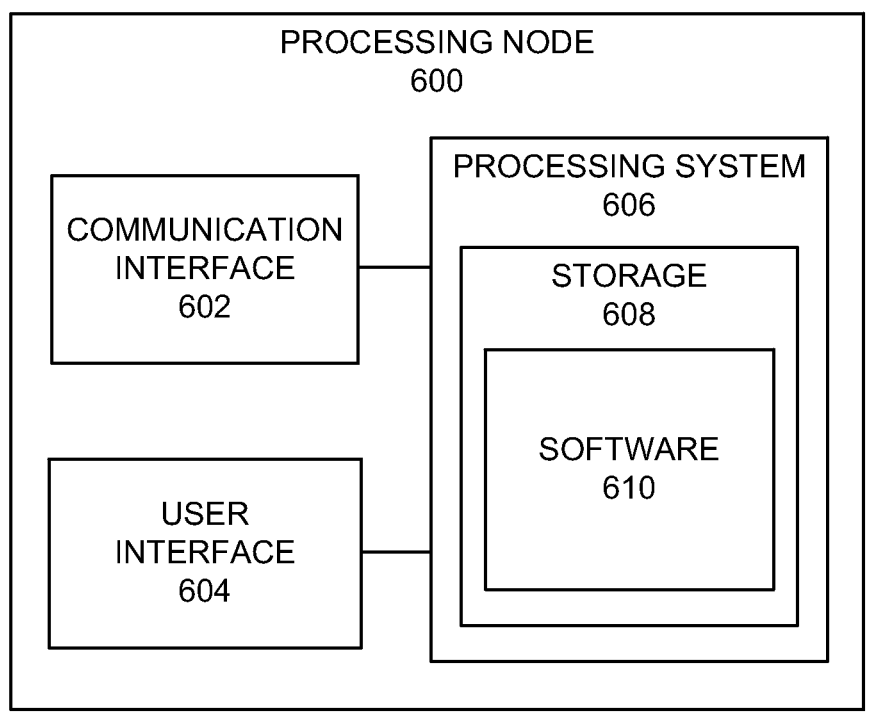
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of detecting unauthorized tethering by a wireless device. Processing system 606 comprises storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include base band unit 106 and base band unit 410. Processing node 600 can also be an adjunct or component of a network element, such as another element of access node 104 or access node 436. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of communication with a wireless device, comprising: receiving at a base band unit data from a communication network for a wireless device; receiving a control signal associated with the data comprising a frequency band identifier; selecting a scheduling module from among a plurality of scheduling modules of the base band unit based on the frequency band identifier; scheduling a transmission of the data to the wireless device using the selected scheduling module; and wherein the plurality of scheduling modules comprises a first scheduling module associated with a first frequency band used by a first network provider and a second network provider, and a second frequency band associated with only the first network provider, and wherein selecting further comprises selecting the first scheduling module when a network provider identifier indicates the second network provider.

2. The method of claim 1, wherein the plurality of scheduling modules comprises a first scheduling module used by a first network provider and a second network provider and a second scheduling module used only by the first network provider.

3. The method of claim 2, wherein selecting further comprises selecting the first scheduling module when the frequency band identifier indicates a frequency band shared by the first network provide and the second provider.

4. The method of claim 2, wherein selecting further comprises selecting the second scheduling module when the frequency band identifier indicates a frequency band used by only the first network provider.

5. A method of communication with a wireless device, comprising: receiving data for a wireless device at a base band unit of an access node from a communication network, wherein the base band unit is controlled by a first network provider, and the wireless device and the communication network are associated with a second network provider; receiving a control signal associated with the data comprising a frequency band identifier and a network provider identifier; selecting a scheduling module from among a plurality of scheduling modules of the base band unit based on the frequency band identifier and the network provider identifier; scheduling a transmission of the data to the wireless device using the selected scheduling module; and wherein the plurality of scheduling modules comprises a first scheduling module associated with a first frequency band used by the first network provider and the second network provider, and a second frequency band associated with only the first network provider, and wherein selecting further comprises selecting the first scheduling module when the network provider identifier indicates the second network provider.

6. The method of claim 5, wherein scheduling further comprises:
scheduling the transmission of the data to the wireless device using the first frequency band when the first scheduling module is selected.

7. A processing node in a communication system, configured to: receive data from a communication network for a wireless device; receive a control signal associated with the data comprising a frequency band identifier; select a scheduling module from among a plurality of scheduling modules based on the frequency band identifier; schedule a transmission of the data to the wireless device using the selected scheduling module; and
wherein the plurality of scheduling modules comprises a first scheduling module associated with a first frequency band used by a first network provider and a second network provider, and a second frequency band associated with only the first network provider, and wherein selecting further comprises selecting the first scheduling module when a network provider identifier indicates the second network provider.

8. The processing node of claim 7, wherein the plurality of scheduling modules comprises a first scheduling module used by a first network provider and a second network provider and a second scheduling module used only by the first network provider.

9. The processing node of claim 8, wherein the plurality of scheduling modules comprises a first scheduling module associated with a first frequency band used by the first network provider and the second network provider, and a second frequency band associated with only the first network provider, and
wherein the processing node is further configured to select the first scheduling module when the network provider identifier indicates the second network provider.

10. The processing node of claim 8, further configured to select the first scheduling module when the frequency band identifier indicates a frequency band shared by the first network provide and the second provider.

11. The processing node of claim 8, further configured to select the second scheduling module when the frequency band identifier indicates a frequency band used by only the first network provider.

12. The processing node of claim 8, further configured to provide the scheduled data to a remote radio unit for transmission to a wireless device.

13. The processing node of claim 7, further configured to schedule the transmission of the data to the wireless device using the first frequency band when the first scheduling module is selected.

* * * * *